BEST AVAILABLE COPY

J. W. FRAZIER.
Cartridge-Box.

No. 8,112. Reissued March 5, 1878.

Witnesses:
Edw^d Payson
Geo. H. Hiatt

Inventor:
Joseph W. Frazier
Per Edw. E. Zeimer
Atty.

N. PETERS, PHOTO-LITHOGRAPHER, WASHINGTON, D. C.

UNITED STATES PATENT OFFICE.

JOSEPH W. FRAZIER, OF NEW YORK, N. Y.

IMPROVEMENT IN CARTRIDGE-BOXES.

Specification forming part of Letters Patent No. 123,883, dated February 20, 1872; Reissue No. 8,112, dated March 5, 1878; application filed January 24, 1878.

*To all whom it may concern:*

Be it known that I, JOSEPH W. FRAZIER, of the city and State of New York, have invented certain Improvements in Cartridge-Boxes, of which the following is a specification:

My improvement relates to the mode of hanging the lid or cover of a cartridge-box; and my invention consists in so attaching the lid or cover to the box or receptacle in which the cartridges are placed that it is adapted, in opening, to swing outwardly and downwardly, and hence, unlike the flap of the ordinary cartridge-box, requires no effort on the part of the soldier to keep the box open while in the act of withdrawing a cartridge therefrom.

Figure 1:
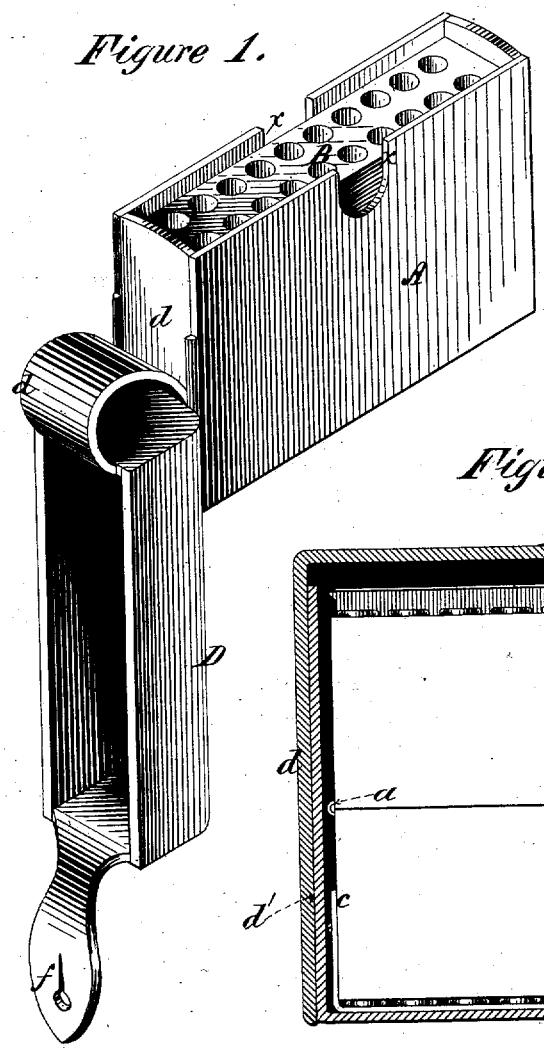
Figure 3:
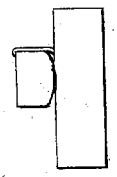
Figure 2:
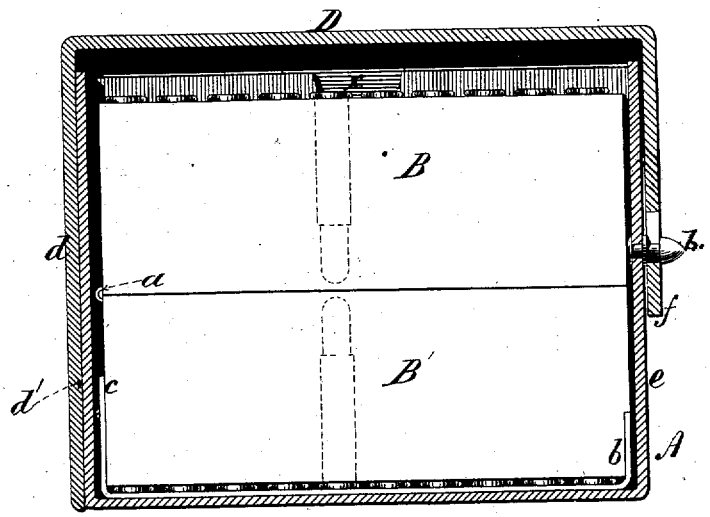

The accompanying drawings are as follows: Figure 1 is a perspective view of my improved cartridge-box, provided with a lid attached to one end by a flexible strap, and swinging outwardly and downwardly therefrom. Fig. 2 is a longitudinal vertical section of the same; and Fig. 3 is an end view of a cartridge-box, showing the cover attached to the front side of the box, and swinging outwardly and downwardly from it.

The greatest objection to ordinary cartridge-boxes is the manipulation demanded in extracting a charge. In order to do this it is necessary to hold up the double flap in front of the box—a matter of inconvenience, if not difficulty, for the soldier, especially when in action and when he is armed with a breech-loader. Holding the weapon in his left hand, the soldier must unbutton and elevate the flap in order to gain access to the interior, and while he extracts a cartridge with the finger and thumb of the right hand, it is necessary to hold up the flap by pressing it against his body with the elbow of his left arm. In other words, the soldier is compelled to adopt a very complex system of manipulation in order to extract a cartridge from an ordinary box and insert it into the breech of a fire-arm, and the difficulty of these manipulations is increased by the excitement of the soldier in action, and by the rapid loading and discharging of weapons demanded by modern warfare.

My invention, which I will now proceed to describe, has been designed with the view of rendering more simple the operation of withdrawing cartridges from a box.

A is the body of the box, made of leather, as usual, and of the ordinary shape, and within this body are deposited the wooden block or blocks, having a number of holes for receiving the metallic cartridges. In the present instance there are two wooden blocks, B and B′, hinged together at *a* for a purpose rendered apparent in a separate application for a patent which I have made for a knapsack and cartridge-blocks combined. The cartridges are retained in the holes of the lower block B′ by a strap, *b*, fastened to one end of the said block, and passing beneath the heads of the cartridges, as shown in Fig. 2, the outer end *c* of the strap being turned up against and buttoned to the opposite end of the block. When the upper tier of cartridges has been exhausted, both wooden blocks are withdrawn from the body of the box and reinserted therein after being reversed, so that what was previously the lower block becomes the upper block, from which the cartridges may be withdrawn after unbuttoning the strap *b*.

In order to permit the ready withdrawal of the blocks from the body of the box, the opposite sides are cut away at *x x*, Fig. 1, to allow the operator to grasp the upper portion of the upper block between his finger and thumb.

Instead of the usual flaps for closing the top of the body of the box, I employ a falling lid, D, having at one end a strap, *d*, united in any suitable manner to the end *d′* of the body, near the lower portion of the same, the strap being long enough to permit the lid to fall to the position shown in Fig. 1. The outer end of the lid is furnished with a short strap, *f*, provided with a slot for attachment to a stud, *h*, at the end *e* of the body of the box. The soldier, desiring to gain access to the cartridges, has simply to unbutton the strap *f* and throw the lid back to the position shown in Fig. 1, when he has no further care about keeping the box open, such as is required to keep up the flap of an ordinary cartridge-box, both hands and arms being at liberty to withdraw the cartridges from the box, load his fire-arm, and discharge the same as rapidly as he may desire.

The falling lid may be, if desired, attached to the front side of the box, as shown in Fig. 3; but whether on the front or on the end, there is an advantage in making the connection of the lid with the box at a point considerably below the top of the box, so that the lid, when open, will fall considerably below the top of the box, and thus be out of the soldier's way, and not obstruct free access to the package of cartridges.

I claim as my invention—

1. A cartridge box or pouch adapted to be worn upon the person, and provided with a cover or lid attached to the front side of the box, and adapted, in opening, to swing outwardly and downwardly therefrom, substantially as and for the purpose set forth.

2. A cartridge box or pouch provided with a lid having a flexible connection with the box or pouch at a point below the top of the box, substantially as and for the purpose deseribed.

JOSEPH W. FRAZIER.

Witnesses:

GEO. W. MIATT,

M. L. ADAMS.